(No Model.)
C. C. YORK.
MACHINE FOR CUTTING CANDY.
No. 599,414.  Patented Feb. 22, 1898.
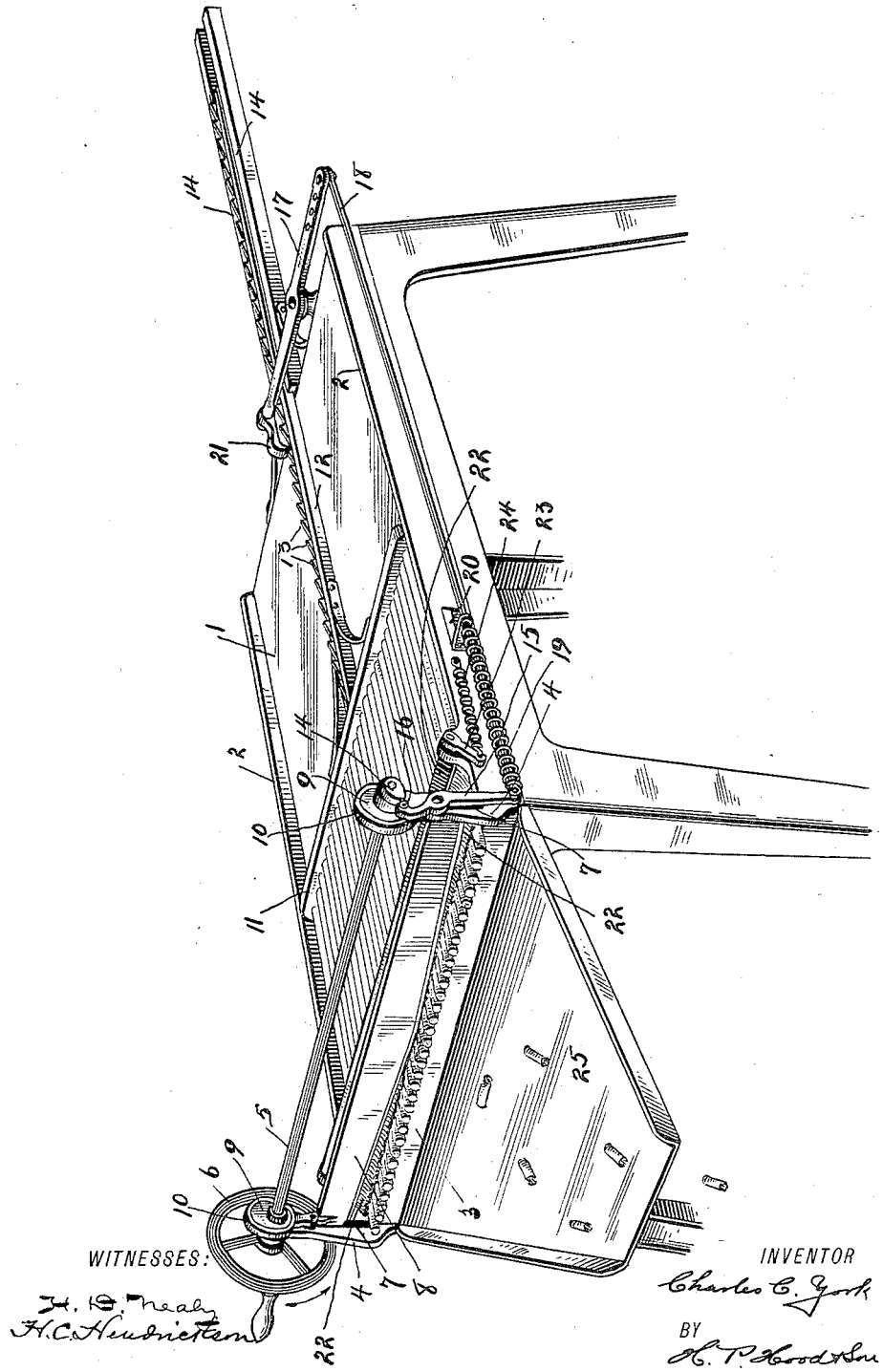
WITNESSES:
INVENTOR
Charles C. York
BY
H. P. Hood & Son
ATTORNEYS.

UNITED STATES PATENT OFFICE.

CHARLES C. YORK, OF INDIANAPOLIS, INDIANA.

MACHINE FOR CUTTING CANDY.

SPECIFICATION forming part of Letters Patent No. 599,414, dated February 22, 1898.

Application filed April 17, 1897. Serial No. 632,533. (No model.)

*To all whom it may concern:*

Be it known that I, CHARLES C. YORK, a citizen of the United States, residing at Indianapolis, in the county of Marion and State of Indiana, have invented new and useful Improvements in Machines for Cutting Candy, of which the following is a specification.

My invention relates to an improvement in candy-cutters.

The object of my invention is to produce a machine for cutting candy into pieces.

The accompanying drawing illustrates my invention, the figure being a view in perspective thereof.

In the drawing, 1 indicates a table provided with sides 2. Secured to the front end of table 1 is a steel bar 3. At each side of the forward end of table 1 is secured an upright 4, in the upper ends of which is journaled a shaft 5, provided at one end with a suitable hand or other drive-wheel 6. Formed in each upright 4 is a vertical guide 7, and mounted in these guides and extending across the forward end of the table is a vertically-movable knife 8, which coöperates with the front edge of bar 3. Mounted upon shaft 5 are two eccentrics 9 9, and surrounding each of said eccentrics in the usual manner is a strap 10, the lower end of which is pivoted to knife 8. For the purpose of pushing the candy into position to be engaged by the knife a feed-bar 11 is mounted on table 1 between the sides 2, and secured to said bar is a rearwardly-extending arm 12, provided upon its upper side with a series of ratchet-teeth 13, the said arm sliding between guides 14, secured to the rear end of the table. For the purpose of automatically moving feed-bar 11 forward a cam 14 is secured to shaft 5. Pivoted to one of the uprights 4 is a lever 15, the upper end of which is provided with a roller 16, adapted to engage cam 14. Pivoted near the rear end of table 1 is a lever 17, the outer end of which is connected to the lower end of lever 15 by means of a rod 18, which may be secured at various points along the outer end of lever 17, thus providing for an adjustment of the throw of the feed-bar. In order to hold roller 16 in engagement with the cam 14, a spring 19 is placed between the lower end of lever 15 and a stop 20, secured to the table. The inner end of lever 17 extends over arm 12 of the feed-bar 11, and pivoted to this end, so as to swing in a substantially vertical plane, is a pawl 21, adapted to engage teeth 13, the free end of said pawl being weighted, so as to hold it in engagement with the teeth. It will of course be understood that other means for holding the pawl in engagement with the teeth may be provided, if desired. Cam 14 is of such shape as to cause the feed-bar to be moved forward suddenly just before the knife starts to descend. If the candy be left free to move upon the table, it will be fed forward unevenly, owing to the sudden movement of the feed-bar. In order to hold the candy in engagement with the feed-bar, a brush 22 is pivoted above the table a short distance to the rear of the knife. Secured to one end of brush 22 is an arm 23, to the free end of which is secured one end of a spring 24, the opposite end being secured to the table, and the arrangement being such that spring 24 will hold the brush in engagement with the candy, thus acting as a brake to keep the candy in engagement with the feed-bar.

In operation the feed-bar is pushed back to the rear end of the table, the candy to be cut is laid on the table in front of the feed-bar, and brush 22 is brought into engagement with the forward end of the candy. The operator then rotates shaft 5 in the direction indicated by the arrow, the said rotation causing eccentrics 9 9 to force knife 8 down across the projecting ends of the candy, the severed portions dropping into a chute 25. A continued rotation of shaft 5 causes the knife to rise, and as the said knife reaches its extreme upper position cam 14 comes into engagement with the upper end of lever 15 and moves it quickly outward. This movement, by means of rod 18, lever 17, pawl 21, and teeth 13, causes the feed-bar to move quickly forward, thus advancing the candy beneath the knife before it descends. In order to vary the length of the severed portions of candy, the point of attachment of rod 18 to lever 17 may be shifted toward or from the pivot thereof. The cutting edge of the knife is arched from the middle toward the ends in order to give a shearing cut.

The machine is particularly designed to cut hard candy, such as stick-candies of various sorts; but it will be readily understood that its use need not necessarily be limited to this particular variety.

I claim as my invention—

1. In a candy-cutter, the combination with the table, of a reciprocating knife coöperating with one end thereof, means for engaging the ends of the candy and for automatically feeding it beneath the knife, and means for holding the candy in engagement with the feeding means, the arrangement being such that the candy may be automatically moved forward beneath the said holding means, without releasing said means, substantially as and for the purpose set forth.

2. In a candy-cutter, the combination with the table, of a reciprocating knife mounted so as to coöperate with one end thereof, a shaft mounted above said knife, an eccentric carried by said shaft, intermediate connecting means between said eccentric and knife, a transverse feed-bar, adapted to engage the ends of the candy, mounted on the table so as to move longitudinally thereon, a cam carried by the shaft, and intermediate connecting mechanism between said cam and feed-bar whereby the feed-bar is advanced by the rotation of the shaft.

3. In a candy-cutter, the combination with the table, of a knife mounted in suitable guides in position to coöperate with one end of said table, a shaft mounted above said knife, an eccentric carried by said shaft, intermediate connecting means between said eccentric and knife, a cam carried by the shaft, a lever engaged by the cam, a transverse feed-bar, adapted to engage the ends of the candy, mounted on the table so as to move longitudinally thereon and provided with a series of ratchet-teeth, a lever pivoted near said feed-bar and provided with a pawl adapted to engage said teeth, a rod connecting the two levers, and a spring for holding the first-mentioned lever in engagement with the cam.

4. In a candy-cutter, the combination with the table, of a reciprocating knife mounted so as to coöperate with one end of the table, means for automatically feeding the candy beneath the knife, and a brush mounted in position to engage the candy and hold it in engagement with the feeding means.

5. In a candy-cutter, the combination with the table, of a knife mounted in suitable guides in position to coöperate with one end of said table, a shaft mounted above said knife, an eccentric carried by said shaft, intermediate connecting means between said eccentric and knife, a cam carried by the shaft, a lever engaged by the cam, a feed-bar mounted on the table and provided with a series of ratchet-teeth, a lever pivoted near said feed-bar and provided with a pawl adapted to engage said teeth, a rod connecting the two levers, a spring for holding the first-mentioned lever in engagement with the cam, a brush pivoted to the rear of the knife in position to engage the candy and hold it in engagement with the feed-bar, and a spring for holding said brush in engagement with the candy, all combined and arranged to coöperate substantially as and for the purpose set forth.

CHARLES C. YORK.

Witnesses:
   A. M. HOOD,
   H. C. HENDRICKSON.